Oct. 6, 1970 — P. W. GRAY — 3,532,399
LABYRINTH-SLING SEAL
Filed Oct. 28, 1968
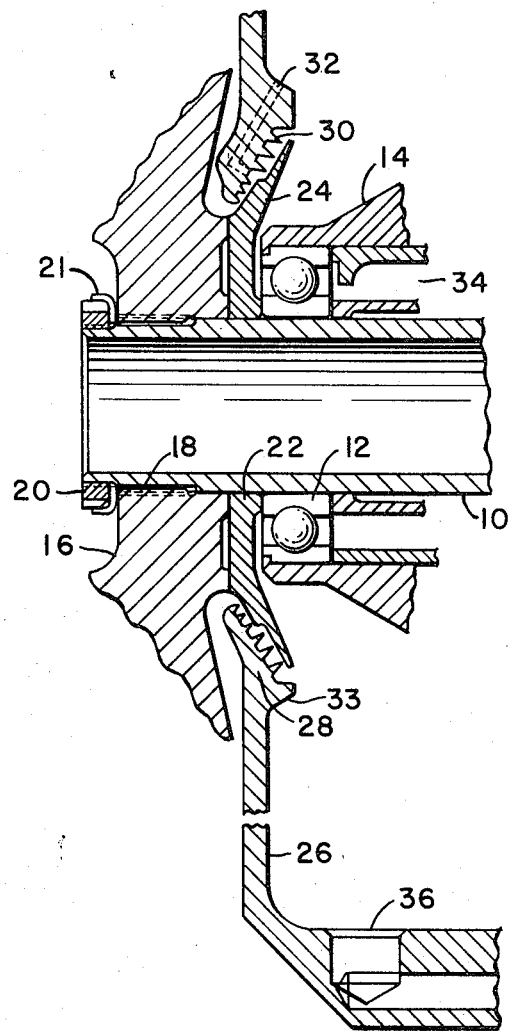
INVENTOR.
PHILIP W. GRAY
BY Charles M. Hogan
Irwin P. Garfinkle
ATTORNEYS.

United States Patent Office 3,532,399
Patented Oct. 6, 1970

3,532,399
LABYRINTH-SLING SEAL
Philip W. Gray, Milford, Conn., assignor to Avco Corporation, Stratford, Conn., a corporation of Delaware
Filed Oct. 28, 1968, Ser. No. 771,054
Int. Cl. F16c 33/80
U.S. Cl. 308—36.4                                  4 Claims

ABSTRACT OF THE DISCLOSURE

The bearings for a rotatable shaft are supplied with lubricating oil which is sealed within the shaft housing by means of a rotating conical sling positioned at an angle of approximately 60 degrees with respect to the shaft axis and a stationary labyrinth-type seal having projections cooperating with the outer surface of the sling. Sealing results from the combination of the slinging action, which radially directs the lubricant into the housing cavity, and by air pressure applied to the labyrinth space for opposing oil flow therethrough.

BACKGROUND OF THE INVENTION

The purpose of this invention is to provide an oil and gas seal that effectively stops oil and gas leakage, and at the same time minimizes axial space requirements. The combination of a labyrinth and sling seal provides a dual acting sealing arrangement taking advantage of the conventional attributes of a labyrinth seal and the advantages of a sling which directs the oil outwardly at an angle of approximately 60 degrees into the housing cavity. Any oil dripping down the walls of the stationary labyrinth member is directed into the scavenge cavity. In addition, the conventional labyrinth-type sealing is augmented by the introduction of high pressure air to oppose oil flow.

THE DRAWING

The single figure illustrates in cross section a typical embodiment of this invention.

DESCRIPTION OF THE INVENTION

Referring to the drawing, a shaft 10 is rotatably supported by means of conventional ball bearings 12 which in turn are supported within a stationary housing member 14. The shaft 10 drives a conventional bladed wheel 16 annularly fixed to the shaft by means of a conventional spline 18 and axially fixed by means of a nut 20 and a washer 21. A disc member 22 clamped between the inner race of bearing 12 and the wheel 16 has a truncated conical slinger element 24 disposed at an angle of approximately 60 degrees with respect to the axis of the shaft.

A stationary annular member 26 affixed to the housing 14 is provided with a conically shaped labyrinth element 28 positioned in complementary relationship to the conical slinger 24. The inner side of the labyrinth element 28 is provided with projections 30 which cooperate with the outer surface of the sling element 24 to provide a tortuous labyrinth path opposing the flow of oil. The annular member 26 is provided with a high pressure air inlet port 32 to which high pressure air is admitted. In addition, the member 26 is provided with a ramp projection 33 for directing dripping oil into the housing cavity. Oil for the bearings 12 is admitted through an oil inlet port 34 which provides for the passage of oil through the bearings and then into the cavity of the housing, at the bottom of which is located a conventional oil scavenge port 36.

In operation, oil admitted under pressure through the oil inlet port 34 lubricates the bearings 12 and then is acted upon by the sling element 24 which serves to sling the oil radially outwardly at an approximate 60-degree angle. Any oil so directed travels by gravity to the bottom of the housing cavity where it exits through the oil scavenge port 36. The flow of oil through the labyrinth is opposed by high pressure air admitted at the air inlet port 32, and by the tortuous labyrinth path provided by the projections 30. Any oil directed onto an interior surface of the housing 26 cannot drip into the labyrinth but will be directed axially rearwardly by the ramp 33 so that such oil will again be picked up by the slinger element 24.

It will be apparent to persons skilled in the art that this invention is subject to various modifications and adaptations. It is intended therefore that the invention be limited only by the scope of the appended claims as interpreted in the light of the prior art.

I claim:
1. The combination comprising:
    a shaft rotatably supported on oil lubricated bearings within the cavity of a stationary housing;
    a substantially conically shaped rigid oil sling affixed to said shaft within said cavity, the surface of said sling being at an acute angle with respect to said shaft, said sling projecting said oil radially outwardly within said cavity; and
    an annular housing member adjacent the outer surface of said sling, said annular member having a plurality of annular projections, the ends of said projections being spaced with minimum clearance from the outer surface of said sling, and which together with said surface provide a tortuous labyrinth path to oppose the flow of oil between said surfaces.
2. The invention as defined in claim 1, and air inlet means to said path, whereby said path may be pressurized to further oppose said flow of oil.
3. The invention as defined in claim 1, and oil outlet means at the bottom of said housing for scavenging the oil in said cavity.
4. The invention as defined in claim 1 wherein said acute angle is approximately 60 degrees.

References Cited

UNITED STATES PATENTS

| | | | |
|---|---|---|---|
| 1,739,046 | 12/1929 | Schwimmer | 308—36.4 |
| 1,791,584 | 2/1931 | Symons | 308—36.3 |
| 1,905,234 | 4/1933 | Labberton | 308—36.4 |
| 2,545,916 | 3/1951 | Clark | 277—68 X |
| 2,598,381 | 5/1952 | Hoffman | 308—36.4 |
| 2,621,087 | 12/1952 | Kluge | 308—36.4 |
| 2,868,574 | 1/1959 | Rich | 277—58 |
| 2,916,332 | 12/1959 | Pavlecka | 277—53 X |
| 2,770,506 | 11/1956 | Derner | 308—187 |

FOREIGN PATENTS

| | | |
|---|---|---|
| 472,708 | 3/1929 | Germany. |
| 715,105 | 11/1941 | Germany. |
| 111,897 | 12/1917 | Great Britain. |
| 925,292 | 5/1963 | Great Britain. |

WESLEY S. RATLIFF, Jr., Primary Examiner

U.S. Cl. X.R.
277—53